July 20, 1926.
B. M. STANNARD ET AL
1,593,108
NONCOLLAPSIBLE VEHICLE TOP
Filed April 8, 1924    2 Sheets-Sheet 1
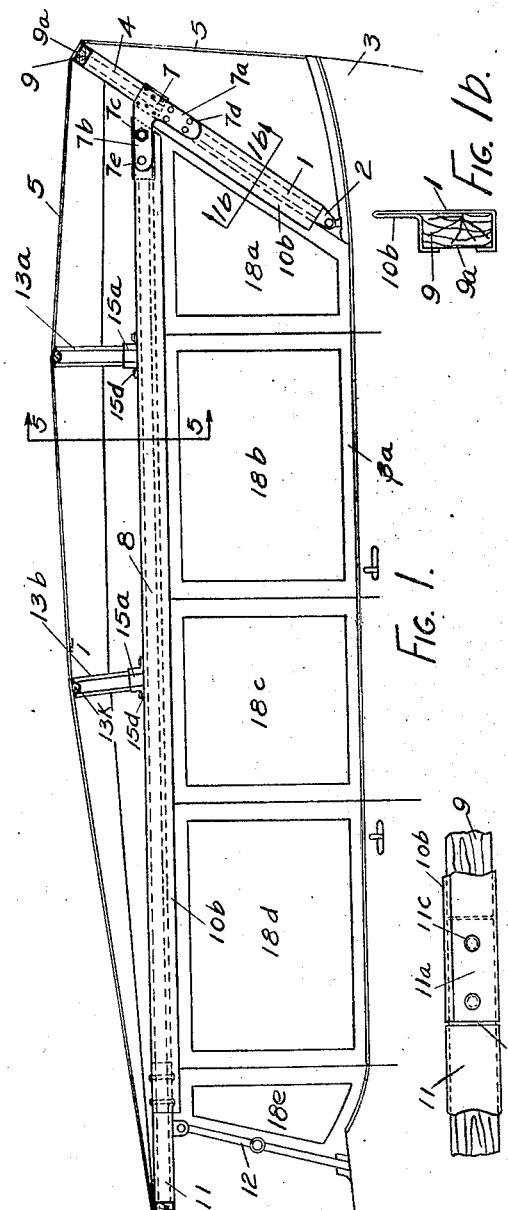
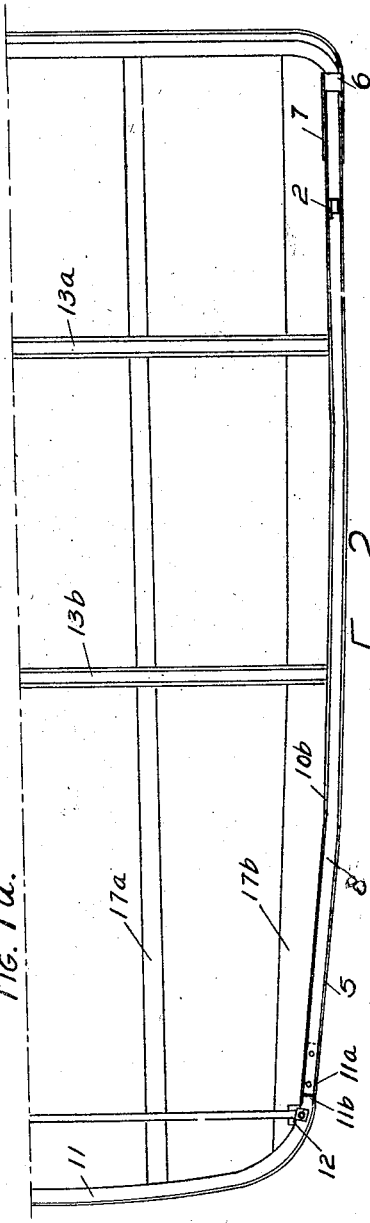
WITNESSES:
H. Gordon Miller
Jessie R. White
BRUCE M. STANNARD
WILLIAM K. BISHOP  } INVENTORS.
AND LYNN EVANS
BY Louis Illmer
ATTORNEY.

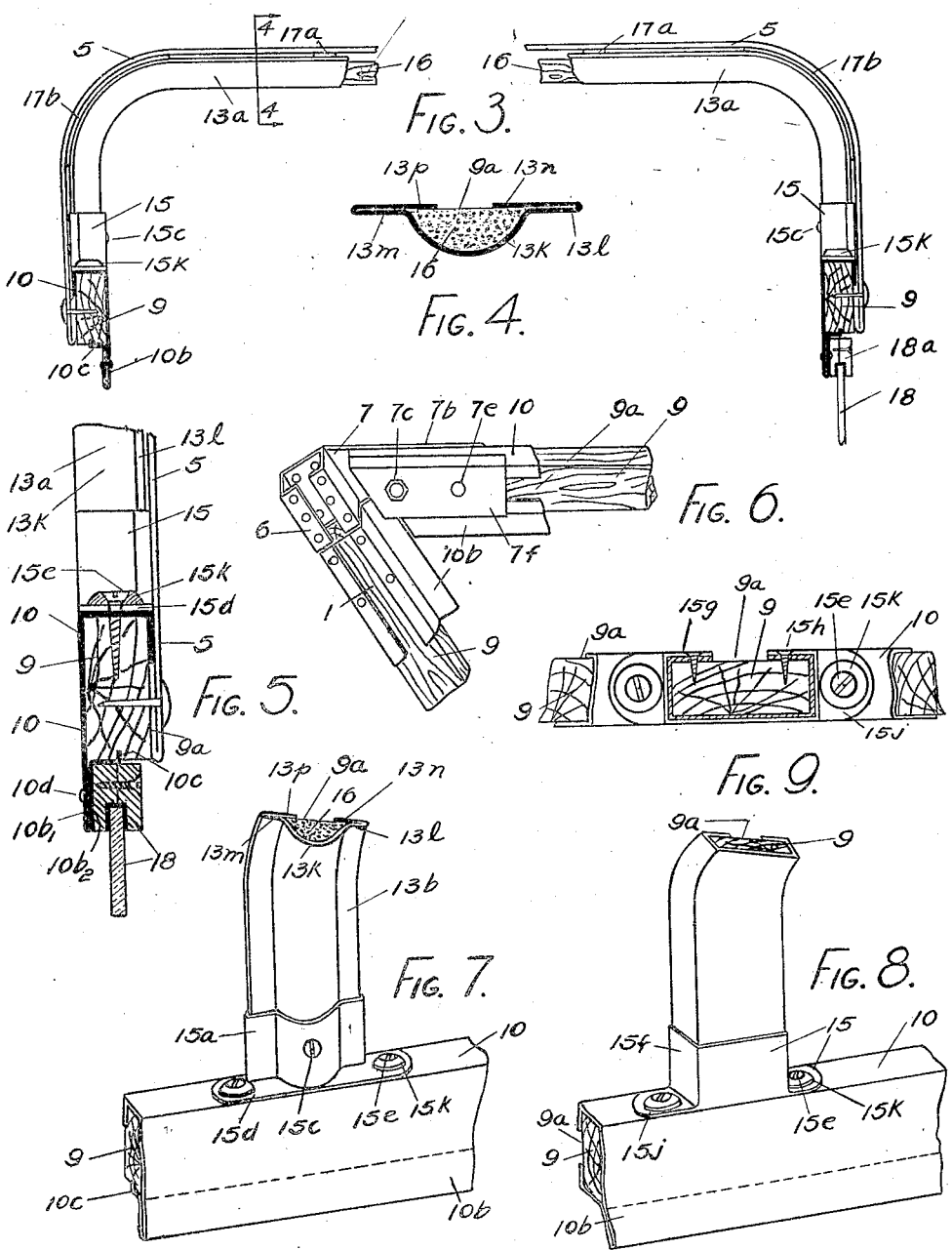

Patented July 20, 1926.

1,593,108

UNITED STATES PATENT OFFICE.

BRUCE M. STANNARD AND WILLIAM K. BISHOP, OF BINGHAMTON, AND LYNN EVANS, OF CORTLAND, NEW YORK, ASSIGNORS TO THE BREWER-TITCHENER CORPORATION, OF CORTLAND, NEW YORK, A CORPORATION OF NEW YORK.

NONCOLLAPSIBLE VEHICLE TOP.

Application filed April 8, 1924. Serial No. 704,924.

Our invention relates to a novel light but exceptionally rigid frame structure for vehicle tops, and pertains particularly to noncollapsible or so-called permanent open tops having removable side curtains or window panels adapted to conveniently change an open top into an enclosed winter top structure for the vehicle body.

A feature of the present frame structure resides in an improved composite type of construction for side rails and in a novel type of transverse bow for bridging these rails. The complementary side rails as well as the support standards and the transverse bows, are all provided with filler blocks which are suitably encased by means of metal sheaths. Each such filler block is exposed through a longitudinal access slot in the metal sheath and this allows of tacking the deck fabric to any part of the top frame structure.

A further important feature of our invention lies in the use of a depending jamb strip formed integrally with the sheet-metal filler sheath. This strip runs lengthwise of the complementary side rails and constitutes an abutting face against which to set the upper sash edge of the sectional window panels. An integral strip is likewise provided along the sheath edge of each support standard against which are mounted the beveled end sections of the complementary side panels.

Embodied herein are also other features of structure and arrangement of parts designed to facilitate the economical manufacture of permanent tops and their application to vehicle bodies, all of which will be set forth in detail hereinafter.

Reference is had to the accompanying two sheets of drawings which illustrate an example of the preferred form of our invention, like characters of reference indicate like parts in the several views, and in which drawings:

Fig. 1, represents an elevational view taken in section lengthwise of the top structure and indicating its points of attachment to a vehicle body.

Fig. 1$^a$, shows in detail the telescoped method of connecting the outrigger bow into the sleeved end of the side rail sheath.

Fig. 1$^b$, is a cross sectional view of the sheathed support standard as taken along line 1$^b$—1$^b$ of Fig. 1.

Fig. 2, shows a half plan or bottom view of Fig. 1 as seen from the underside of the deck fabric.

Fig. 3, illustrates the constructive details of a transverse bow and its assemblage on the normally disposed side rail structure, as taken along the line 5—5 of Fig. 1.

Fig. 4, is a cross-sectional profile view of our improved half round filler type of transverse bow as taken on line 4—4 of Fig. 3.

Fig. 5, is an enlarged cross-sectional profile view of our side rail and its integrally formed jamb strip similar to that of Fig. 3 except that certain elements are shown in partial section and broken away for the purpose of illustrating the constructive features of our particular type of fastening means; this view also shows details of the deck fabric trim and the method of abutting the window panel against the jamb strip.

Fig. 6, shows in perspective some further details of the bow receiving socket for mounting the rear bow; also the re-enforcing plate for securing and locking the upper end of the standard to the side rail structure.

Fig. 7, represents a perspective view illustrating the clip fastening device used to tie our half round filler block type of intermediate transverse bow to one of its supporting side rails.

Fig. 8, illustrates a modified type of transverse bow and tie clip therefor; this view also shows a modified profile shape for the side rail sheath in which both of its longitudinal sheath edges are made to grip the fourth side of a rectangular filler block.

Fig. 9, represents a top view of Fig. 8 showing the foot flange details of our novel bow clip and method of fastening same to the side rail.

The illustrative embodiment of our invention comprises a pair of main supporting standards such as 1, having their lower ends mounted upon a gooseneck iron such as 2, which iron is secured to each side of the vehicle body 3 in the conventional manner. The main bow standard is preferably made up of sheet metal sheaths, the longitudinal edges of which are crimped over and snugly encase a rectangular or any other parallelogram shaped wood filler block 9 such as is shown in Fig. 1b.

Each of said composite support standards extend upward and rearward with respect to the horizontal top edge or body trim line 3a, and the upper free ends of the respective standards are each provided with a slotted bow receiving socket 6 (see Fig. 6) adapted to connect said standards with the rear bow 4 in the aligned fashion shown in Fig. 1. This rear bow is preferably sheathed in a manner similar to that used in the structure of the standard 1, and the cover or deck fabric 5 is stretched downward over the edge of said bow 4 to fall flush with the rear of the body tonneau 3.

As is indicated in Fig. 1, the upper end of each standard is further equipt with an angular bracket plate 7, the depending leg 7a of which is fastened to the standard by means of the rivets 7d, while the other leg 7b is pivotally secured to the side rail 8 by the pin 7c and locked thereto by means of the removable through bolt 7e. The fulcrum pin 7c and its spaced lock bolt 7e are both intended to extend through the sheathed side rail elements designated in their entirety as 8 in Fig. 1. On the inner face of said rail, that is to say on the side opposite that holding the bracket leg 7b, a reenforcing plate 7f is provided against which the nut of the bolt 7e may be screwed up tight. By removing the bolt 7e, the support standard 1 may be swung about the fulcrum 7c and made to lie alongside the rail 8, whenever it is desired to collapse the unassembled top for the purpose of compactly stacking the side rail structure while in storage or transport prior to mounting the deck fabric thereon.

Each assembled side rail member such as 8, is made up of a continuous metal sheath which encases a filler block preferably made of wood or like fibrous substances. Each of the complementary composite rails is supported at its rearward end by its respective standard and extends forward therefrom over the vehicle body in a substantially horizontal plane with respect to the top edge or trim line 3a. The tacking slot or access gap 9a of each side rail is intended to face outwardly with respect to the center line of said rails so as to facilitate their use for tacking purposes.

As shown in Figs. 1 and 2, the forward or free ends of said complementary side rails are bridged by means of the composite front or outrigger bow 11 which lies in alignment with the rail plane. The filler block of this bow is also metal sheathed in a manner identical with that of the side rail except for the use of a jamb strip. The bow 11 may likewise be provided with a tacking slot 9a adapted to abut with that of the rail slots, thus constituting continuous outwardly disposed access gap running entirely around the bridged rail elements.

It is preferred to utilize a hollow or incomplete cross-sectional profile for the side rail filler block sheath, and particularly one of essentially crimped channel-like contour as illustrated in Fig. 5. The side rail sheath proper is formed from a strip of sheet metal conforming to the contour of the rectangular wood filler block 9, and the longitudinal edges of the sheath strip 10 are crimped over the filler corners so as to snugly encase or grip the same. Furthermore, each of these sheathed or composite side rails is provided with a depending jamb strip designated in its entirety by 10b. This member is formed integrally with the filler sheath, and this improved formation of the jamb strip constitutes an important feature of the present invention, since it is intended to serve as an abutting face against which to mount the top sash face of the window panels 18, as indicated in Fig. 5.

Referring in detail to the characteristic profile formation of the metal rail sheath 10, its filler block 9 is wholly encased on two of its sides by the sheath member 10 and partially so on its two other filler sides, leaving an access gap 9a between the longitudinal sheath edges for tacking purposes. If preferred, substantially similar results may be obtained by the use of the modified sheath profile shown in Fig. 8, where three sides of the filler are wholly encased and the accessory gap 9a is confined to the fourth side of the filler block 9.

With reference to the integral construction of our jamb strip as shown in Fig. 5, it will be observed that the vertical or closed side wall of the sheath profile is extended downward from the sheath member 10 to constitute a depending leg $10^{b}_{1}$, which is then bent back upon itself in the form of a complementary or re-enforcing leg $10^{b}_{2}$, which legs respectively project from and return to the profile contour of the filler sheath member 10, and together constitute the jamb strip 10b. The free longitudinal edge of the upturned leg $10^{b}_{2}$ is then sharply bent outward and away from the depending leg $10^{b}_{1}$ to complete the sheath 10 along the bottom face of the rectangular filler block 9. Said bottom wall is provided with an inturned longitudinal ledge 10c adapted to fit into a registering groove cut into the filler block. Rivets 10d or equivalent tie means such as spot welding, may be employed to prevent the depending leg 10c from springing away from its adjacent return leg 10d. The open style of sheath shown in Fig. 5, provides for an augmented gap 9ª and allows of tacking the deck fabric 5 close down to the lower corner of the rectangular filler block. In the more complete style of rail sheath shown in Fig. 8, the bottom wall thereof is carried around the fourth corner of the filler block 9, but in either style, the sheath is made to engage or grip more than three sides of the rectangular filler block.

As indicated by Fig. 1ª, the sheath construction used for the support standard 1, is also provided with a jamb strip 10ᵇ which is substantially similar in construction with that described in connection with the side rail structure.

The sheath ends of the outrigger bow 11 are cut off square and made to abut with the respective outer sheath ends of the complementary side rails. Each of the rail filler blocks is preferably cut off short of its abutting sheath joint 11ᵇ to constitute a sleeve element 11ª therefor, while the filler block of the respective bow legs are made to extend beyond said joint so as to telescope into the said sleeve element 11ª as shown in Fig. 1ª. The projecting outrigger bow filler ends may be secured to said rail sleeve elements by means of the rivets 11ᶜ, while the front bow 11 is supported in the conventional manner by means of the windshield stanchion 12.

The combined side rail and jamb strip structure serves in the capacity of back bone for the top frame, and these rails are further bridged by a series of intermediate transverse bows designated as 13ª and 13ᵇ. As shown in Figs. 3 and 4, these bows are also metal sheathed and made to encase a wood filler in a modified manner from that used for the side rail structure, but the tacking strip is likewise turned outward to face the deck fabric 5.

Referring in detail to the constructive features of our improved type of transverse composite bow as shown in cross-sectional profile, the filler block 16 may be made of half-round wood of any kind, but it is preferred to utilize split fillers made of relatively flexible palm stems of the genus Calamus, commonly known as rattan cane. This initially full round and relatively tough fibrous material is well suited for tacking purposes and can readily be bent without resorting to a steaming process. The sheath for such half-round core 16 comprises a surrounding dished or semi-circular sheet metal portion 13ᵏ provided with outwardly disposed wing portions 13ˡ and 13ᵐ which lie in substantial alignment with the flat or split face of said half-round filler. Each of the outermost or longitudinal edges of the sheet metal sheath are then inturned upon their respective wing members to form the lip strips 13ⁿ and 13ᵖ. The inner longitudinal edges of these lips overlap the flat filler edges but are spaced apart to provide for the access gap 9ª therebetween. It will be apparent that full-round cane fillers may readily be encased within the sheath in a similar manner, in which event the sheath would be similarly formed but the inturned lip portions thereof would be sprung away somewhat from their respective wing portions so as to grip upon the rounded contour of the filler instead of its flat face.

The leg ends of the sheathed transverse bow such as 13ª, are squared and adapted to bear snugly against the flat top faces of their respective side rails and said legs are rigidly secured thereto by means of the bow clips designated in its entirety as 15. In the construction shown in Fig. 7 each such clip is provided with an upright socket element or sleeve-like part 15ª, the end of which snugly engages and surrounds the described wing and lip members of the bow sheath. The adjacent ends of the socket wall are preferably spaced apart somewhat to give resiliency to the said socket and provide for an access gap essentially similar to that previously described in connection with the transverse bow sheath elements. The socket element 15ª is secured to the bow filler 16 by means of wood screws 15ᶜ or the like. The base of said clip socket 15ª is further equipt with a set of outwardly disposed foot flanges 15ᵈ, both of which lie in the plane of the squared end of the bow legs and are adapted to rest snugly upon the top face of the side rail sheath 10. These laterally projecting foot flanges are each perforated and further provided with wood screws 15ᵉ which screw into the filler block 9 of the side rail, as indicated. Under the heads of said rail screws, special conically shaped re-enforcing washer means 15ᵏ are provided which are shown in partial section in Fig. 5. These relatively heavy washers are purposely made large in diameter and serve to re-enforce the foot flanges by distributing the screw load over same. These improved constructive features of the bow clip provide for an exceptionally simple, neat and rigid tie means between the bow legs and the side rails.

Fig. 8 is similar to Fig. 7, but as previously pointed out, it shows a modified type of profile shape for the side rail sheath. This view also illustrates a modified type of sheath for the transverse bow in so far as a rectangular filler core 9 is used therefor substantially similar to that of the side rail. In this case, the bow clip 15 is correspondingly modified to comprise a substantially oblong upright socket element 15ᶠ having inturned wall members 15ᵍ secured to the rectangular transverse bow filler block 9 by means of two screws such as 15^h shown in Fig. 9. The two short parallel side walls of the socket element disposed crosswise of the side rail, are provided with a pair of aligned foot flanges such as 15^j which are identical in purpose with the foot flanges 15^d, previously described in connection with Fig. 7. The foot flanges 15^j are likewise provided with screws 15^e and re-enforcing washers 15^k, which are preferably set close toward the corner edge of the upturned foot flanges.

The plural transverse bows may be bound together by means of the strainer webs 17^a and also by the corner pad webs 17^b, both of which run lengthwise of the body from the outrigger bow to the rear bow, while the strainer webs extend downward and tie to the rear of the body tonneau 3.

The assembled frame parts are covered with a deck fabric 5 as indicated in the various views. By virtue of the exposed tacking strip for the wood fillers as provided throughout our top structure, said fabric may readily and cheaply be fastened to any of the frame parts as required. Fig. 5 shows in detail the preferred method of trimming the quarter deck fabric to the side rail. The fabric edge is underturned and sewed, whereupon it is tacked along the side rail filler block at any desired pitch as indicated.

Referring further to the mounting of the window panels which are best indicated in Figs. 1 and 5; the combined side rail and jamb strip are preferably made to lie parallel to the plane of the top body edge or trim line 3^a and as shown in Fig. 2, the forward or windshield ends of the complementary side rails are slightly kinked or bent inwardly toward each other to conform to the plan lines of the body contour. This dishing of the side rails allows the side window panels to be conveniently and neatly mounted between said parallel rails and the body trim line and the depending jamb strip 10^b provides an abutting face against which to mount the top sash edge of the window panels. These side panels are preferably fashioned into sectional door and window sashes as 18^b, 18^c and 18^d, having end pieces 18^a and 18^e adapted to square up the adjacent sash edges thereof. The upper and lower edges of these panel sashes may be secured in any convenient manner to the rail jamb strip 10^b and the body trim line 3^a, respectively, while the rear end piece 18^a is also intended to abut against the jamb strip 10^b projecting from its support standard 1 and may be suitably fastened thereto along the beveled sash edge thereof.

It will be understood that the longitudinal tacking slot 9^a provided for the various filler sheaths need not necessarily be a continuous one since a plurality of accessory slots placed at a suitable pitch, may be made to serve the same purpose. Furthermore, our novel bow parts and other structural details generally may readily be subjected to modification without departing from the spirit and scope of our invention, heretofore described and more particularly pointed out in the appended claims.

Claims:

1. A non-collapsible top structure for a vehicle body, a standard for each side of the body adapted to support the rearward portion of the top, complementary composite side rails of parallelogram profile respectively secured to said standards and extending forwardly therefrom, each such rail comprising a sheath covering more than three sides of said rail profile with an access gap disposed between the longitudinal edges of said sheath, a filler block encased within each such sheath, said fillers being set back from the forward ends of their respective sheaths so that said sheath ends constitute sleeve elements, an outrigger bow adapted to bridge said rails having its legs extending into said sleeve elements, and fastening means securing said leg ends to their respective sleeve elements.

2. A non-collapsible top structure for a vehicle body, a standard for each side of the body adapted to support the rearward portion of the top, complementary composite side rails respectively secured to said standards and extending forwardly therefrom, each such rail comprising a filler block with a sheath therefor provided with an access gap and an integral jamb strip, said filler being shortened with respect to the fore part of the side rail so that its sheath end constitutes a sleeve element, and an outrigger bow adapted to span said side rails having the legs thereof fastened into the respective sleeve elements.

3. A non-collapsible top structure for a vehicle body, standards adapted to support the rearward portion of the top, a composite side rail secured to one of the standards, said side rail comprising a filler block and a sheath therefor provided with an access gap serving to expose the encased filler block, and an integral jamb strip disposed lengthwise of said rail sheath, said strip comprising a depending leg and a re-enforcing leg respectively projecting from and returning to the profile contour of the filler sheath.

4. A non-collapsible top structure for a vehicle body, a supporting standard for each side of the body, complementary composite side rails respectively secured to said standards and extending forwardly therefrom, each such rail comprising a filler block and a sheath therefor provided with an access gap serving to expose said encased filler block, and an integral jamb strip disposed lengthwise of each of the rail sheaths, said strip comprising a depending leg and a reenforcing leg respectively projecting from and returning to said profile contour of the filler sheath.

5. A non-collapsible top structure for a vehicle body, a supporting standard for each side of the body, complementary composite side rails respectively secured to said standards and extending forwardly therefrom, said rails each comprising a filler block and a sheath therefor provided with an access gap serving to expose said encased filler block, an integral jamb strip disposed lengthwise of each of the rail sheaths, said strip comprising a depending leg and a reenforcing leg respectively projecting from and returning to said profile contour of the filler sheath, and tie means for said adjacent jamb strip legs.

6. A non-collapsible top structure for a vehicle body, a supporting standard for each side of the body, complementary composite side rails respectively secured to said standards and extending forwardly therefrom, said rails each comprising a filler block and a sheath therefor provided with an access gap and an integral jamb strip depending from and disposed lengthwise of said rail, an outrigger bow bridging the free ends of said rails, a rear bow bridging said standards, and an intermediate transverse bow also bridging said side rails.

7. A non-collapsible top structure for a vehicle body comprising a vehicle deck fabric, a supporting standard for each side of the body, complementary composite side rails respectively secured to said standards and extending forwardly therefrom over and substantially parallel to the top edge or trim line of the body, said rails each comprising a filler block and a sheath therefor, said sheath being provided with an access slot for tacking the fabric to the filler block and being further provided with an integral jamb strip depending from and disposed lengthwise of the rail, an outrigger bow bridging the forward ends of said rails, a support means for said outrigger bow, and a side panel mounted between said rail and the trim line of the body, the panel sash being set to abut said integral jamb strip.

8. A non-collapsible top structure for a vehicle body, a standard for the body adapted to support the rearward portion of the top, a composite side rail secured to said standard and extending forwardly therefrom, said rail comprising a filler block of substantially rectangular cross-sectional profile and a metal sheath adapted to encase or grip more than three sides of said rail block having an access gap between the longitudinal edges of said sheath, and a ledge means for one of said sheath edges adapted to engage with a registering groove in the filler block.

9. A non-collapsible top structure for a vehicle body, a composite supporting standard for the body adapted to support the rearward portion of the top, said standard comprising a filler block with a sheath therefor equipt with an integral jamb strip, a composite side rail secured to said standard and extending forwardly therefrom in angular relation, said rail similarly comprising a filler block with a sheath therefor equipt with an integral jamb strip, and a side panel section adapted to abut against both said rail and standard jamb strips.

10. A non-collapsible top structure for a vehicle body, a composite supporting standard comprising a filler block and a sheath therefor provided with an integral jamb strip, an angular bracket plate having one of its legs secured to said standard, a side rail pivotally fastened to the other leg of said plate, and a detachable bolt means spaced from the pivot and extending through said plate and side rail to normally lock the pivotal movement of said rail with respect to the standard.

In testimony whereof, we have signed our names to this specification.

BRUCE M. STANNARD.
WILLIAM K. BISHOP.
LYNN EVANS.